No. 686,259. Patented Nov. 12, 1901.
D. CAMERON & H. CLINGEN.
PROCESS OF TREATING FOOD PRODUCTS IN CANS.
(Application filed Mar. 1, 1901.)
(No Model.) 3 Sheets—Sheet 1.
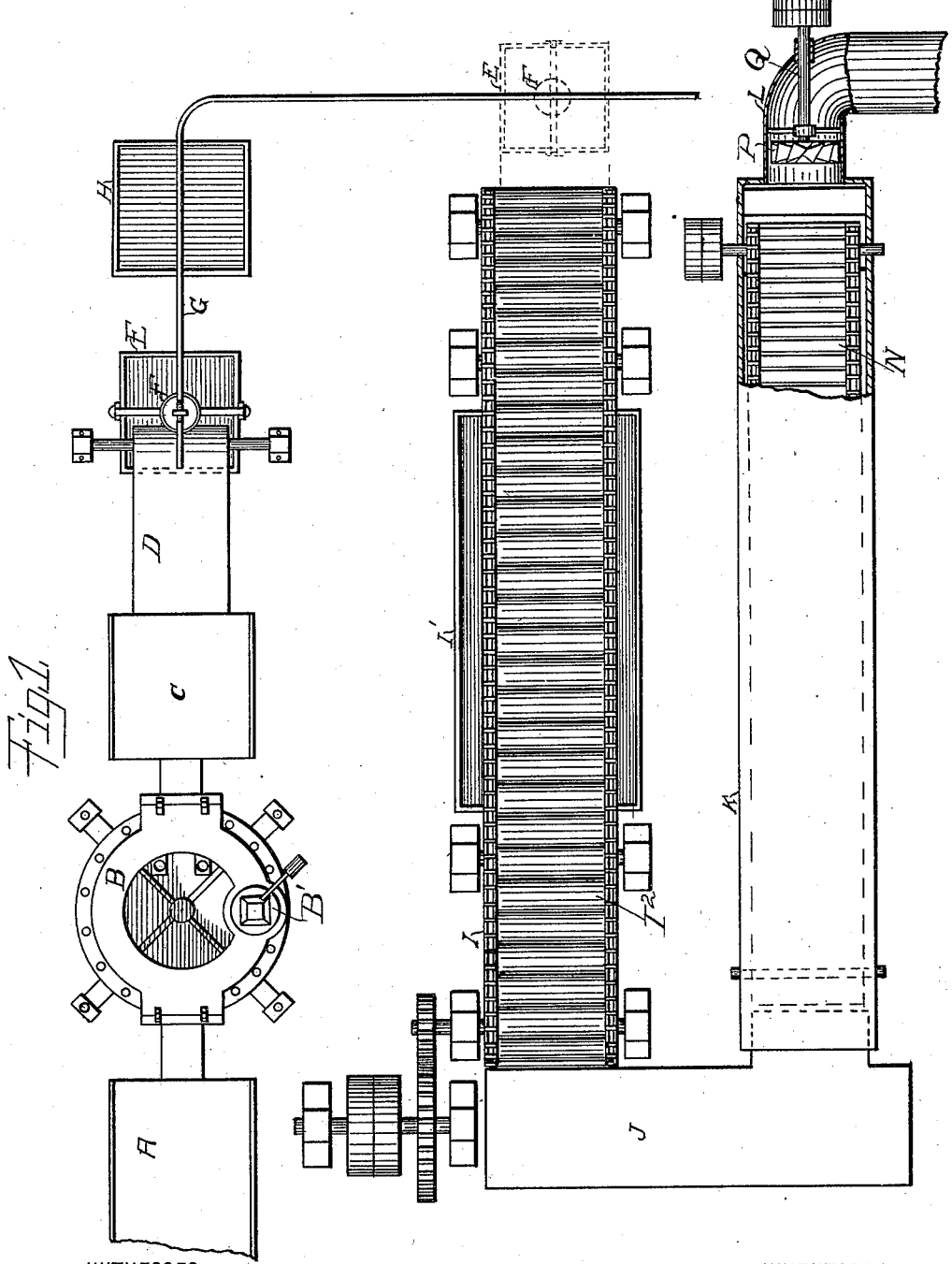

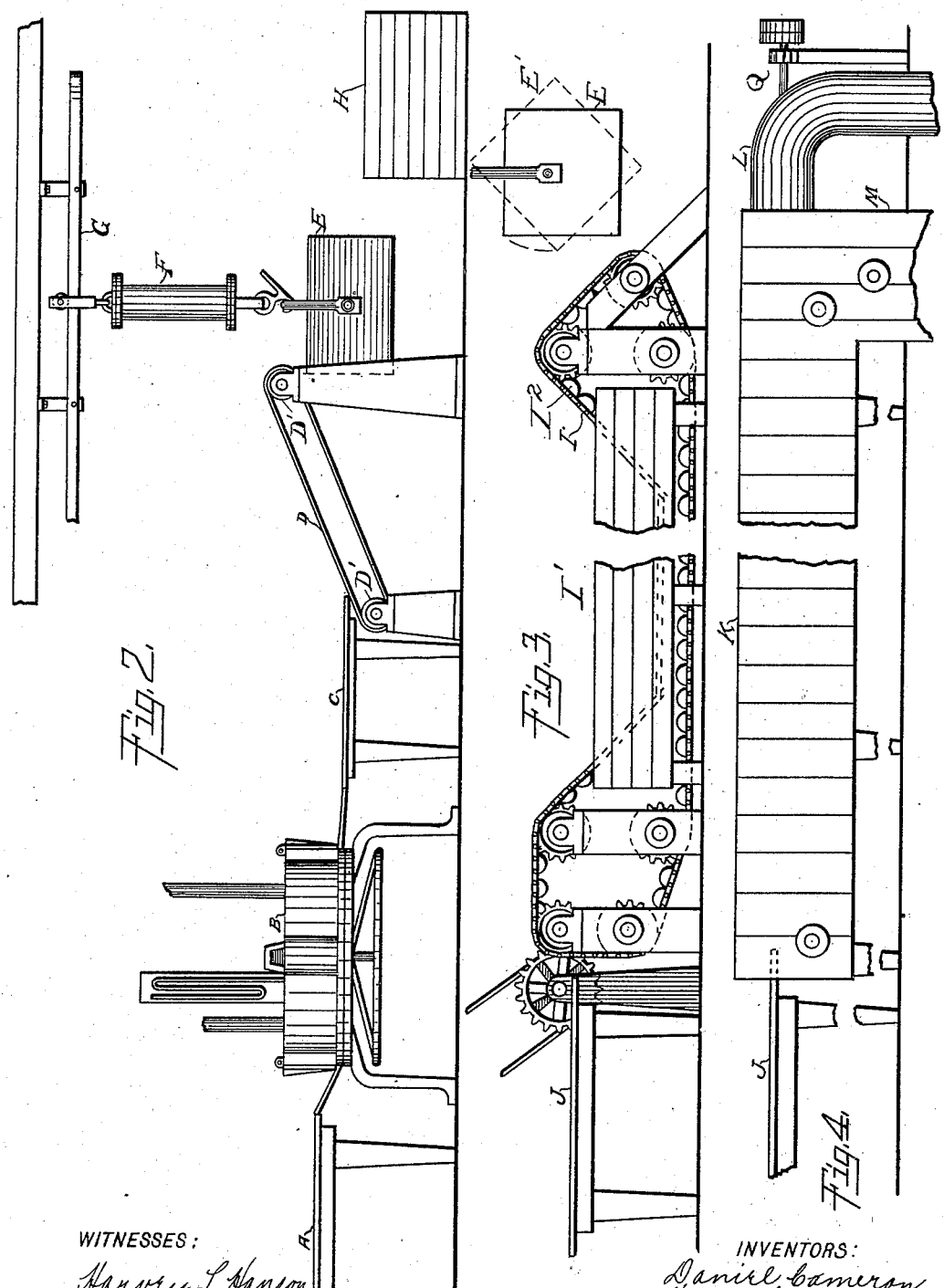

No. 686,259. Patented Nov. 12, 1901.
D. CAMERON & H. CLINGEN.
PROCESS OF TREATING FOOD PRODUCTS IN CANS.
(Application filed Mar. 1, 1901.)
(No Model.) 3 Sheets—Sheet 3.
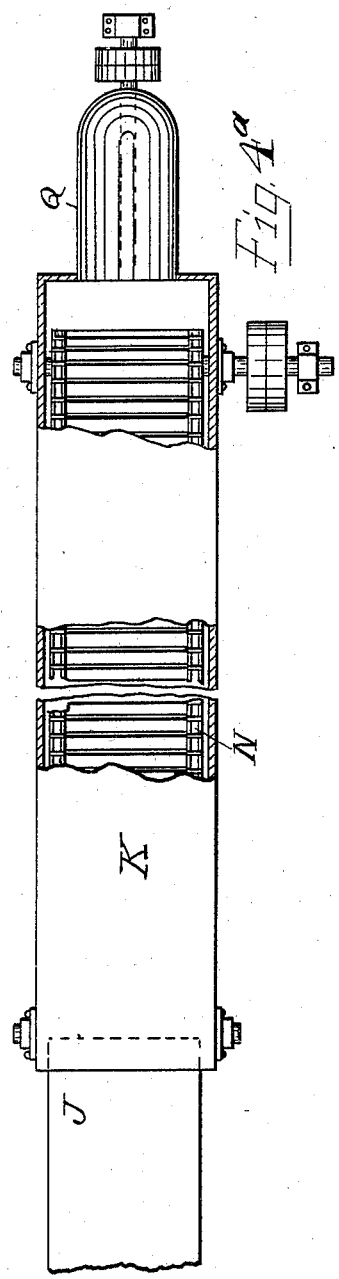
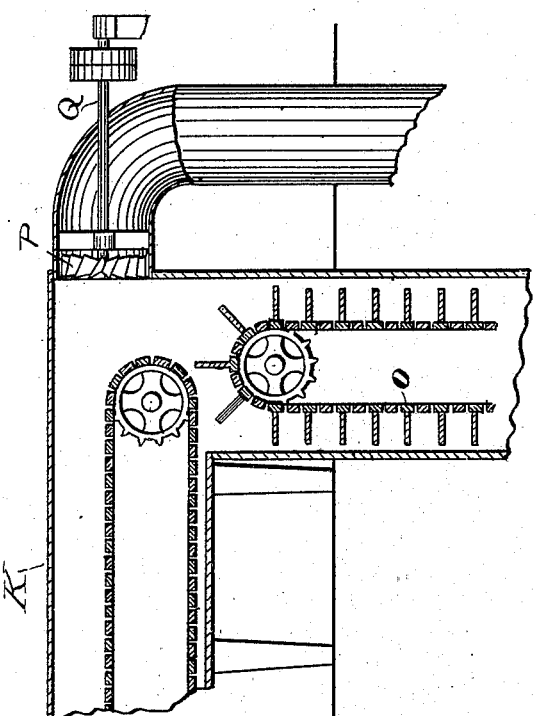
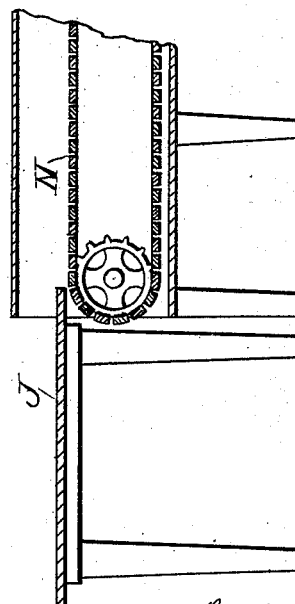
WITNESSES:
Harvey L. Hanson.
H. F. Obergfell.
INVENTORS:
Daniel Cameron,
Harry Clingen.
BY Charles A. Brown & Bagg
ATTORNEYS.

UNITED STATES PATENT OFFICE.

DANIEL CAMERON, OF KANSAS CITY, MISSOURI, AND HARRY CLINGEN, OF SOUTH OMAHA, NEBRASKA, ASSIGNORS TO CUDAHY PACKING COMPANY, OF CHICAGO, ILLINOIS, A CORPORATION OF ILLINOIS.

PROCESS OF TREATING FOOD PRODUCTS IN CANS.

SPECIFICATION forming part of Letters Patent No. 686,259, dated November 12, 1901.

Application filed March 1, 1901. Serial No. 49,402. (No specimens.)

*To all whom it may concern:*

Be it known that we, DANIEL CAMERON, residing at Kansas City, in the county of Jackson and State of Missouri, and HARRY CLINGEN, residing at South Omaha, in the county of Douglas and State of Nebraska, citizens of the United States, have invented certain new and useful Improvements in Processes of Preserving Food Products, (Case No. 1,) of which the following is a full, clear, concise, and exact description, reference being had to the accompanying drawings, forming a part of this specification.

Our invention is a process for preserving food products; and its object is to accomplish the treatment of the food product which is necessary to its preservation in a rapid, economical, and thorough manner, while retaining the nutritive value of such food and, so far as possible, its natural flavor.

It is essential to the preservation of food products, and especially meats, that may be transported to warm climates that they be inclosed in hermetically-sealed packages, the entire contents of which are thoroughly sterilized. This is accomplished by subjecting the can and its contents to a heat which will produce as nearly as possible a sterile condition of the contents of the can and by withdrawing as far as possible the air which may be in the can in order to insure still further the absence of the bacteria, which cause decay.

It is important that the process of withdrawing the air from the cans and sealing them, the heating of the cans and their contents, and then the cleansing and cooling of the cans be done as expeditiously as possible, both from the point of view of economy in production and from the point of view of quality of the product. Too long cooking of the contents of the can destroys in a measure the nutritive value of the food and impairs its flavor. It is desirable, too, that the attendant may have under his control the time for which the heating of the can shall continue. One food product requires longer "cooking" than another, and the time for which any one food product should be cooked differs with the temperature to which it is subjected.

Our process is an improvement upon the processes heretofore employed to secure these results, and consists in the method hereinafter particularly set forth.

We will describe our invention by reference to the accompanying drawings, in which—

Figure 1 shows the complete apparatus by means of which the various steps of our process are carried out. Fig. 2 shows in elevation the vacuum-chamber, the basket, and cooking-tank which are employed in carrying out certain steps of our process, together with various accessories associated with these instrumentalities. Fig. 3 shows the cleansing-tank and conveyer by which the packages containing the food products are cleaned. Figs. 4 and 4ª show the cooling-duct or wind-trunk partly broken away to show the conveying mechanism contained therein. Fig. 5 is a sectional elevation of the same wind-trunk by which the final step of our process is performed.

The cans are passed from the table A into the vacuum-chamber B, where they are passed beneath the transparent plate B'. The air is continually exhausted from the vacuum-chamber and by means of a vent-hole in the can the air within the can is exhausted. While still in this vacuum-chamber and after the air has been withdrawn from the can, the vent-hole is sealed by means of an electric soldering-iron. This particular operation constitutes no part of our invention, and we do not consider that it is necessary further to describe this step in the process, as it is familiar to those skilled in the art. After the can has been sealed as above described it is withdrawn from the vacuum-chamber and passed to the table C, whence it may be conveyed as occasion requires by means of the belt D running over the pulleys D' into the basket E, which is suspended upon the overhead track G by means of the air-hoist F, which permits the basket to be raised and lowered and adjusted in a position to receive the cans as they are delivered from the belt D. When the basket E is loaded with cans, it is carried by means of the overhead track to the tank H, which is partially filled with a liquid, preferably one which does not vaporize at a temperature considerably in excess of 212°, such as lard or tallow. This permits the heating of the liquid to a high degree, and thus facilitates the cooking of the food products in the sealed cans. The attendant is able to determine with accuracy the time required for the cooking. By "cooking" is meant the heating of the cans and their contents in the vat H for the purpose of thoroughly sterilizing the contents of the cans. The length of time required for the cooking depends upon the contents of the cans and also upon the heat of the liquid, as is well known to those skilled in the art. After the cans with their contents have been subjected to the sterilizing heat for a sufficient length of time the basket E is withdrawn from the heating liquid and is carried by means of the overhead track G, as is shown in Fig. 1, to a point where it may be tilted and deliver the cans to the conveyer I, which is provided with the pockets $I^2 I^2$ to receive the cans and to carry them through the cleansing-vat I', which is provided with a cleansing solution, preferably heated and preferably consisting of bicarbonate of soda and water. After the cans have been cleansed by this process they are automatically delivered upon the table J and are then ready for the final step of the process, so far as our invention is concerned. This consists in the automatic cooling of the cans by conveying them through a wind-trunk K upon the conveyer N, which delivers the cans to the perpendicular conveyer O, carried upon the sprocket-wheels. This last-named conveyer carries the cans to the labeling-table, which is not shown, as this does not concern the process of our invention. A blast of cold air is forced against the cans in a direction opposite that in which they are moving as they are carried along upon the conveyer N by means of the blower P, which is driven by the shaft Q, which, together with other driven machinery which is shown, is operated by any suitable prime mover, such as a motor, preferably geared to the driving-shaft. The air may be cooled in any suitable way and brought to the wind-trunk K through the pipe L. By means of this cold blast thus applied we are able to cool the cans and their contents quickly and to dry the surfaces of the cans at the same time. This cooling by the cold-air blast also involves a very small expenditure of power.

Our entire process enables us to sterilize the contents of sealed metal packages thoroughly, subjecting them to the proper amount of heat to secure this result without losing the natural juices of the meat or other contents of the can, and thus assist in preserving the natural flavor of the food and all its nutritive value. The immediate cooling by the cold-air blast (the moisture being extracted from the air, if desired) assists in accomplishing the perfect treatment of the food product in the cans.

The different steps in the treatment above described, to which the cans containing meat or other food product are subjected, may be summarized as, first, venting; second, sealing; third, cooking; fourth, cleansing, and, fifth, cooling.

The fifth step, which consists in cooling by a blast of air directed upon the cans as they are conveyed away from the cleansing-vat in a direction opposite to that in which they are moving, is broadly new with us. In the other steps certain specific improvements are of our invention.

What we claim as new, and desire to secure by Letters Patent, is—

1. The herein-described process of treating food products in cans which consists in venting the cans, sealing them, immersing them in a heated liquid, subjecting them to a cleansing-bath in a heated alkaline solution, passing them through a wind-trunk, and forcing a current of air upon them in a direction opposite to that in which they are moving, substantially as described.

2. The herein-described process of treating food products in cans which consists in venting the cans, sealing them *in vacuo*, immersing them in a heated liquid, subjecting them to a cleansing-bath in a heated alkaline solution, passing them through a wind-trunk, and forcing a current of air upon them in a direction opposite to that in which they are moving, substantially as described.

3. The herein-described process of treating food products in cans which consists in venting the cans, sealing them *in vacuo*, immersing them in a heated liquid, subjecting them to a cleansing-bath in a heated solution of bicarbonate of soda, passing them through a wind-trunk, and forcing a current of air upon them in a direction opposite to that in which they are moving, substantially as described.

In witness whereof we hereunto subscribe our names this 21st day of February, A. D. 1901.

DANIEL CAMERON,
HARRY CLINGEN.

Witnesses:
 C. O. FITCH,
 T. W. TALIAFERRO,
 E. W. BOYLES,
 F. I. CLARK.